US011264923B2

(12) United States Patent
Adams

(10) Patent No.: US 11,264,923 B2
(45) Date of Patent: Mar. 1, 2022

(54) VORTEX FLUX GENERATOR

(71) Applicant: Silicon Turbine Systems, Inc., Campbell, CA (US)

(72) Inventor: Richard Adams, Grass Valley, CA (US)

(73) Assignee: Silicon Turbine Systems, Inc., Cupertino, CA (US)

( * ) Notice: Subject to any disclaimer, the term of this patent is extended or adjusted under 35 U.S.C. 154(b) by 0 days.

(21) Appl. No.: 17/062,598

(22) Filed: Oct. 4, 2020

(65) Prior Publication Data

US 2021/0265925 A1 Aug. 26, 2021

Related U.S. Application Data

(63) Continuation of application No. 16/428,161, filed on May 31, 2019, now Pat. No. 10,797,619, which is a continuation of application No. 15/465,686, filed on Mar. 22, 2017, now Pat. No. 10,312,835.

(60) Provisional application No. 62/312,981, filed on Mar. 24, 2016.

(51) Int. Cl.
*H02K 55/00* (2006.01)
*H02N 11/00* (2006.01)
*F25B 21/00* (2006.01)

(52) U.S. Cl.
CPC .......... *H02N 11/002* (2013.01); *F25B 21/00* (2013.01); *H02K 55/00* (2013.01)

(58) Field of Classification Search
CPC ...... H02N 11/00; H02N 11/002; H02K 55/00; H02P 13/00; F25B 21/00
See application file for complete search history.

(56) References Cited

U.S. PATENT DOCUMENTS

| 6,031,311 A * | 2/2000 | Lee ...................... H02K 1/2766 |
| | | 310/156.57 |
| 2011/0241478 A1* | 10/2011 | Adams ................. H02N 11/002 |
| | | 310/306 |
| 2017/0279381 A1* | 9/2017 | Adams ................. H02N 11/002 |

FOREIGN PATENT DOCUMENTS

| WO | WO-2010038196 A2 * | 4/2010 | ........... H02N 11/002 |
| WO | WO-2011130126 A1 * | 10/2011 | ........... H02N 11/002 |

* cited by examiner

*Primary Examiner* — Naishadh N Desai
(74) *Attorney, Agent, or Firm* — Toering Patents PLLC

(57) ABSTRACT

Various implementations of the invention correspond to an improved vortex flux generator. In some implementations of the invention, the improved vortex flux generator includes a magnetic circuit configured to produce a magnetic field; a quench controller configured to provide a variable current; a vortex material configured to form and subsequently dissipate a vortex in response to the variable current, wherein upon formation of the vortex, a magnetic field density surrounding the vortex is urged to decrease, and wherein upon subsequent dissipation of the vortex, the urging to decrease ceases and the magnetic field density increases prior to a reformation of the vortex, and wherein the decrease of the magnetic field density and the increase of the magnetic field density correspond to a modulation of the magnetic field; an inductor disposed in a vicinity of the vortex such that the modulation of the magnetic field induces an electrical current in the inductor; and a dissipation superconductor electrically disposed in parallel with the vortex material and configured to carry, without quenching, an entirety of the variable current during dissipation of the vortex in the vortex material.

6 Claims, 6 Drawing Sheets

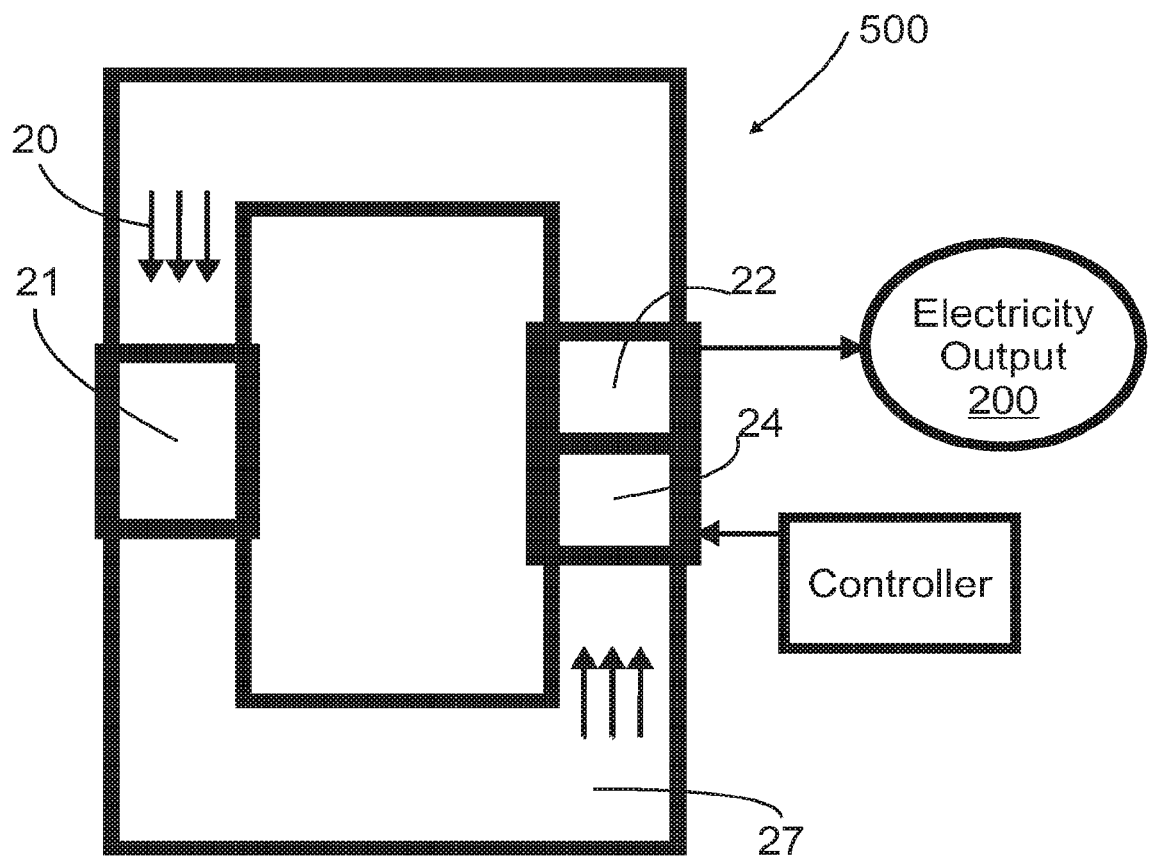
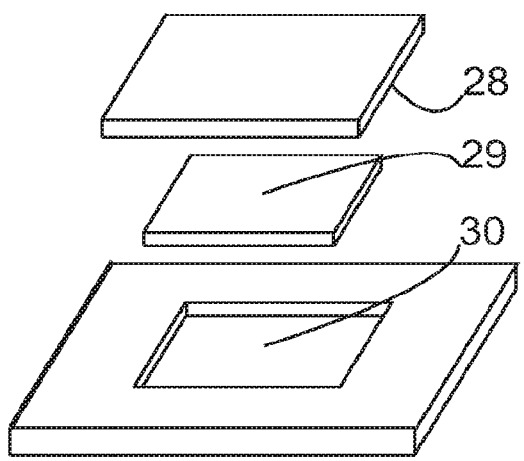
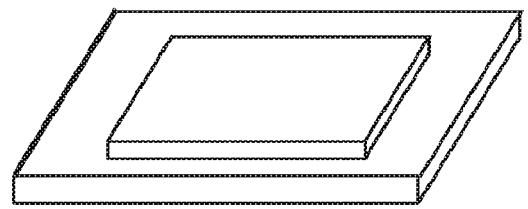
FIG. 2A  FIG. 2B

VORTEX FLUX GENERATOR

CROSS-REFERENCE TO RELATED APPLICATIONS

This Application is a continuation application of U.S. application Ser. No. 16/428,161, which was filed on May 31, 2019, and entitled "Improved Vortex Flux Generator," now U.S. Pat. No. 10,797,619; which is a continuation application of U.S. application Ser. No. 15/465,686, which was filed on Mar. 22, 2017, and entitled "Improved Vortext Flux Generator," now U.S. Pat. No. 10,312,835; which in turn claims priority to U.S. Provisional Application No. 62/312,981, which was filed on Mar. 24, 2016, and entitled "Improved Vortex Flux Generator." Each of the foregoing applications is incorporated herein by reference in its entirety.

This Application is related to: U.S. patent application Ser. No. 15/923,904, entitled "Vortex Flux Generator," which was filed on Mar. 16, 2018; which in turn is a continuation application of U.S. patent application Ser. No. 15/406,628, entitled "Vortex Flux Generator," which was filed on Jan. 13, 2017, now U.S. Pat. No. 9,923,489; which in turn is a continuation application of U.S. patent application Ser. No. 14/181,834, entitled "Vortex Flux Generator," which was filed on Feb. 17, 2014, now U.S. Pat. No. 9,548,681; which in turn is a continuation application of U.S. patent application Ser. No. 13/121,472, entitled "Vortex Flux Generator," which was filed on Jun. 9, 2011, now U.S. Pat. No. 8,692,437; which in turn is a 371 National Phase application of International Application No. PCT/IB2009/054268, entitled "Vortex Flux Generator," which was filed on Sep. 30, 2009; which in turn claims priority to U.S. Provisional Patent Application No. 61/194,881, filed on Sep. 30, 2008. Each of the foregoing applications is incorporated herein by reference in its entirety.

This Application is also related to: U.S. patent application Ser. No. 15/818,433, entitled "Method and Apparatus for Electricity Generation Using Electromagnetic Induction Including Thermal Transfer Between Vortex Flux Generator and Refrigerator Compartment," which has a filing date of Nov. 20, 2017; which in turn is a continuation application of U.S. patent application Ser. No. 13/640,683, entitled "Method and Apparatus for Electricity Generation Using Electromagnetic Induction Including Thermal Transfer Between Vortex Flux Generator and Refrigerator Compartment," which has a filing date of Feb. 19, 2013, now U.S. Pat. No. 9,822,997; which in turn is a 371 National Phase application of International Application No. PCT/US2011/031789, which was filed on Apr. 8, 2011; which in turn claims priority to U.S. Provisional Patent Application No. 61/323,293, filed on Apr. 12, 2010. Each of the foregoing applications is incorporated herein by reference in its entirety.

FIELD OF THE INVENTION

Various implementations of the invention relate to systems and methods for energy conversion. More specifically, various implementations of the invention relate to systems and methods for cyclical conversion of an input energy source into kinetic energy of a magnetic field modulated by vortices, and then into electric energy.

BACKGROUND OF THE INVENTION

The following definitions are used herein:

Electrical conductor: An assemblage of matter that forms a volume of material with the property of conducting electric current with low loss or no loss.

Diamagnetism: A property of matter where magnetic fields permeate with a reduced degree of penetration, or are repelled, defined here to clarify the definition of vortices used herein.

Vortex (when used, the plural "vortices" is also implied): Matter forming an area, located within and/or adjacent to a vortex material, that has the characteristic of reduced diamagnetism within the area, relative to a comparatively increased diamagnetism outside the area. The area may be comprised of an additional dimension establishing a volume. The reduced diamagnetism allows a higher magnetic field density within a vortex, while the area surrounding the vortex has a relatively lower density of the magnetic field. Vortices are formed by a set of conditions applied to a vortex material. For example, by placing a vortex material, that may be comprised of a superconductor material, in a magnetic field, and transferring heat energy out of the material, urging the material into the superconducting state, vortices form within and/or adjacent to the material. When a vortex forms, the magnetic field density inside the vortex increases, and because the field may be comprised of a total field in an area in which that field is conserved, the magnetic field surrounding the vortex is urged to decrease, such that the total conserved field, comprising the field inside and outside the vortex, remains the same.

Vortex material: An assemblage of matter within and/or adjacent to which a vortex can form. The vortex that forms may do so because of conditions comprised by the properties of the said vortex material. An example vortex material is a superconductor material. The vortex material may be comprised of an assemblage of various materials that include both superconducting and non-superconducting materials, such that assemblage will produce a vortex. In additional to a material that forms vortices, the other matter assembled may be comprised of materials that include mechanical support, energy flow connections, insulation, and materials that urge an artificial means to predispose the location that a vortex will form. The vortex material may be re-entrant, meaning that the vortex forms and subsequently dissipates in the vortex material, without any external stimulation. The vortex material may be non-re-entrant, meaning that that a vortex forms and/or dissipates only upon external stimulation. The vortex material may be comprised of materials that exhibit both re-entrant and non-reentrant behavior. The vortex material may be comprised of materials that can be stimulated to form and dissipate vortices by a controlling means that transfers energy into and out of the vortex material. The vortices that form may be comprised of predisposed dimensions that are determined by the properties of the assemblage of matter that forms the vortex material, and determined by the environmental conditions that the vortex material is operated in. By artificially compelling a plurality of vortices to form at predetermined locations, other vortices nearby will also form at predictable locations nearby the vortices specifically compelled, by virtue of predisposed dimensions of the vortices.

Magnetic field modulation: A change in the density of a magnetic field permeating an area of matter, whereby the change occurs over an interval of time. For example, the formation and dissipation of a vortex will change the magnetic field near where the vortex forms and dissipates. This changing magnetic field over time is a kinetic energy, comprised of a movement of the density of the field, also known as a modulation of the magnetic field, since the field density is moving as time elapses. This may be referred to as field modulation, field density change, movement of magnetic flux, or modulation of the field.

Inductor: An electrical conductor formed such that magnetic field modulation nearby the electrical conductor induces an electric current to flow in the electrical conductor.

SUMMARY OF THE INVENTION

Various implementations of the invention correspond to an improved vortex flux generator. In some implementations of the invention, the improved vortex flux generator includes a magnetic circuit configured to produce a magnetic field; a quench controller configured to provide a variable current; a vortex material configured to form and subsequently dissipate a vortex in response to the variable current, wherein upon formation of the vortex, a magnetic field density surrounding the vortex is urged to decrease, and wherein upon subsequent dissipation of the vortex, the urging to decrease ceases and the magnetic field density increases prior to a reformation of the vortex, and wherein the decrease of the magnetic field density and the increase of the magnetic field density correspond to a modulation of the magnetic field; an inductor disposed in a vicinity of the vortex such that the modulation of the magnetic field induces an electrical current in the inductor; and a dissipation superconductor electrically disposed in parallel with the vortex material and configured to carry, without quenching, an entirety of the variable current during dissipation of the vortex in the vortex material.

These implementations, their features and other aspects of the invention are described in further detail below.

BRIEF DESCRIPTION OF THE DRAWINGS

FIG. 1 illustrates a schematic of a vortex flux generator in accordance with various implementations of the invention.

FIG. 2A is an expanded perspective illustration of a method to mount the vortex material chip and the inductor chip sandwiched together with a mounting substrate.

FIG. 2B is a perspective illustration of a method to mount the vortex material chip and the inductor chip sandwiched together with a mounting substrate from FIG. 2A, where the sandwiched chips are mounted to the mounting substrate, and one of the sandwiched chips is concealed inside the recess of the mounting substrate.

FIG. 3 is an enlarged expanded perspective schematic illustration of the layered components that an inductor in the vortex flux generator may be comprised of.

DETAILED DESCRIPTION

Figure 3:
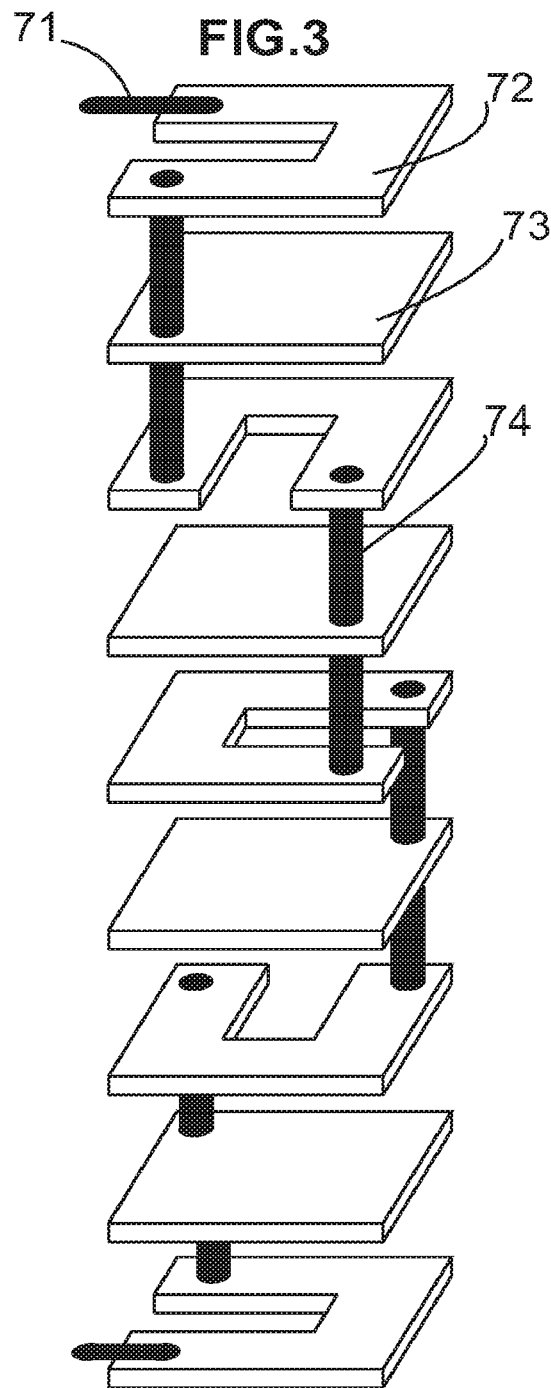

In describing various implementations of the invention illustrated in the drawings, specific terminology is employed for the sake of clarity. However, these implementations of the invention are not intended to be limited to specific terminology so selected, and it is to be understood that each specific element includes all technical equivalents that operate in a similar manner to accomplish a similar purpose. The scale of the components used in the illustrations is comprised of a scale suitable for illustrative purposes. The actual dimensions of the components fabricated in a preferred embodiment may be comprised of a different scale as would be appreciated.

According to various implementations of the invention, a vortex flux generator 500 (illustrated in FIG. 1) combines known properties of vortex materials, including magnetic flux modulation, to urge an electric current to flow in an inductor using known properties of electromagnetic induction.

Referring to FIG. 1, a magnetic circuit is formed using a magnetic core 27, comprised of a magnetic powder or amorphous metal with a 0.7 Tesla magnet or magnets 21, comprised of a permanent magnet or electromagnet inserted in the circuit, yielding a magnetic field denoted by the illustrative field lines 20. A vortex material 24 and an inductor array 22 are placed within the magnetic circuit. Thereby, the vortex material and inductor array are adjacent to each other in the magnetic field. The elements of the component labeled "Controller" in FIG. 1 are detailed in FIG. 11. The Electricity Output 200 represents the power output of the present invention.

Referring to FIG. 3, a microscopic inductor is fabricated using microelectronic fabrication. This fabrication process is comprised of a layered microelectronic process analogous to the process currently used to fabricate CMOS integrated circuit chips. The exemplary expanded inductor illustrated in FIG. 3 is comprised of five layers of copper alloy electrical conductors 72, where the trace width and spacing is fifty five nanometers. Both the trace height of eighty two nanometers, and insulator 73 thickness of ten nanometers, are not proportionally scaled to the thickness of the electrically conductive layer in the illustration. An electrically conductive via 74, through the insulator 73, interconnects the layers of the inductor.

An electrical interconnect 71 may be comprised of a continuation of the trace of the electrical conductor 72. This interconnect 71 may be used to connect to other inductor assemblies. An analogous interconnect, at the bottom-most conductor layer illustrated, provides the connection for the opposite end of the inductor assembly in FIG. 3.

Figure 4:
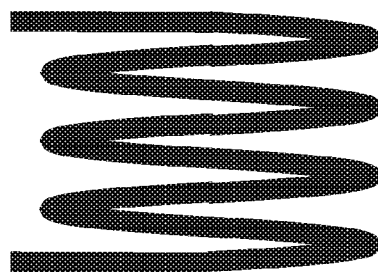
FIG. 4 is an enlarged illustration of a helical coil of electrically conductive matter that is analogous to and may be utilized as the inductor in the vortex flux generator.

In the exemplary implementation, each layer of the electrically conductive material is an arced segment that is not closed upon itself. Each layer comprises, for example, three-fourths of a turn of an equivalent helical coil. Alternately, a helical coil fabricated from a fifty nanometer diameter wire, depicted in FIG. 4, may be utilized as the inductor in various implementations.

Figure 3A:
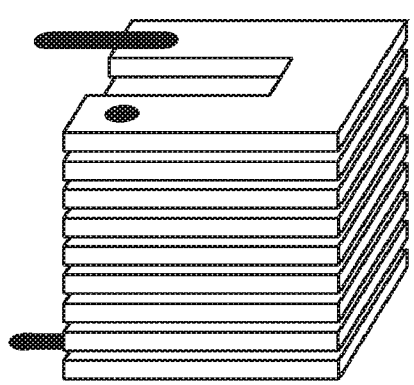
FIG. 3A is an enlarged expanded perspective schematic illustration of the layered components that an inductor in the vortex flux generator may be comprised of, where the layered components of FIG. 3 are illustrated in a manner that is more representative of how these layered components are actually assembled together. Compared to FIG. 3, the components in FIG. 3A are illustrated with a lesser degree of vertical expansion, and more components are hidden by adjacent components.

In FIG. 3A, the expansion of the view in FIG. 3 is decreased, forming a more uniform illustration. This inductor assembly of FIG. 3A is comprised of the same components as FIG. 3.

Figure 8:
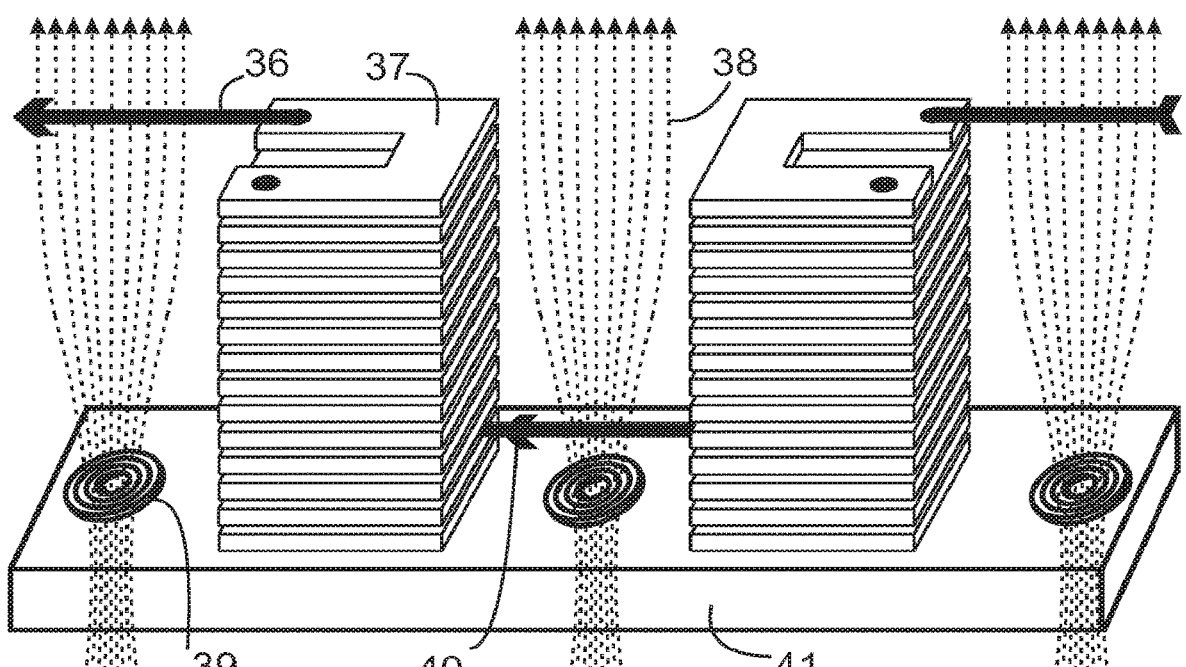
FIG. 8 is an enlarged expanded perspective schematic illustration that depicts the magnetic flux being modulated by a plurality of vortices, and a plurality of layered inductors analogous to the inductor of FIG. 3A, that are interconnected in series, producing electricity.
Figure 10:
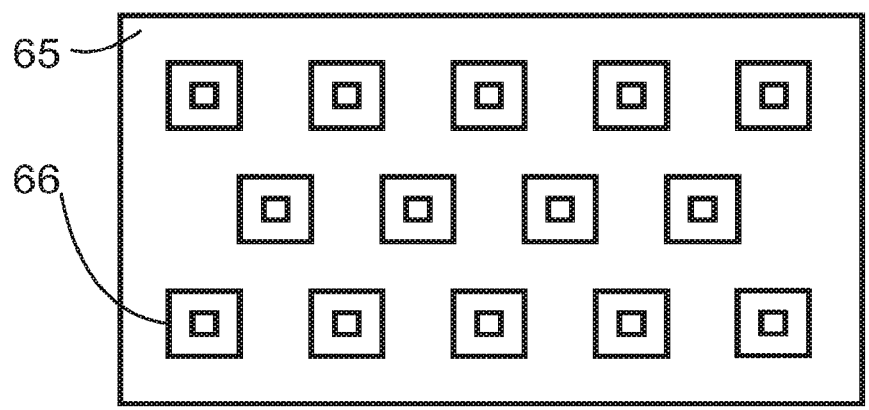
FIG. 10 is an enlarged expanded illustration looking upon the plane of an array of inductors that are manufactured analogous to the inductor of FIG. 3A, in positions that correspond to the urged location of the vortices depicted in FIG. 9B.

In FIG. 8, the inductor assembly 37 is comprised of, for example, seven layers of an electrical conductor, and seven layers of insulator, comprising five and one quarter turns of the conductor that comprises the inductor, about its central axis. Other numbers of layer of electrical conductor and insulator may be used as would be appreciated. The inductor 37 is an extension of the assembly in FIG. 3A, with more layers, such that the electrical interconnects 36 and 40 for the assembly exit on opposite sides, facilitating interconnection to the adjacent inductor assembly also illustrated in FIG. 8, and interconnected with trace extension 40. In FIG. 10, fourteen of these layered inductor assemblies 66 are depicted in an array upon a substrate 65. The substrate 65 is comprised of a one millimeter silicon wafer.

Figure 6:
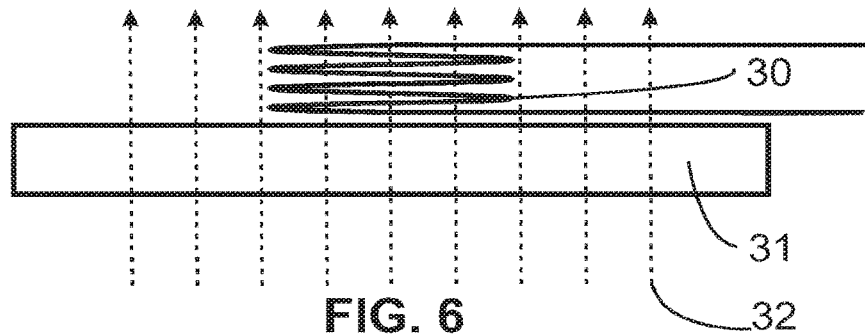
FIG. 6 is an enlarged schematic illustration of a single inductor disposed near a vortex material, wherein a depicted magnetic field density is not modulated by a vortex.

Referring to FIG. 6, a single inductor 30 is illustrated. Magnetic flux lines 32 are illustrated in the state where no vortex is present from the vortex material 31, and there is negligible current flowing in the inductor 30.

Figure 7:
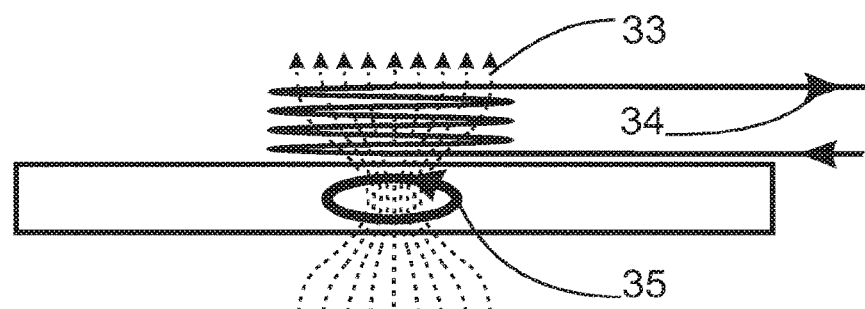
FIG. 7 is the enlarged schematic illustration identified as FIG. 6, with a vortex now present. The vortex is modulating the magnetic flux, and inducing electricity in the inductor.

FIG. 7 illustrates the same components as FIG. 6, wherein a vortex 35 has formed, and the magnetic field indicated is increasing in density in the vortex 35, and in the adjacent single inductor. The increasing magnetic field density is illustrated by 33. While the magnetic field density is increasing in the inductor, electric power flows from the inductor, indicated by the arrow 34. Though not depicted, when the vortex dissipates, electric power also flows from the inductor, with the current in the opposite direction, according to Lenz's Law.

FIG. 8 illustrates a placement of inductor assemblies 37 in between the location that vortices 39 form from a vortex material 41. Three vortices are shown, although other numbers of vortices may be used as would be appreciated. By this placement of the inductors, the magnetic flux density decreases in the inductors when the vortices form. This decrease in flux density induces electric power to flow from each of the inductor assemblies. The interconnect 40 connects the two illustrated inductor assemblies illustrated in series. This connection accumulates the electric power from the inductors. The interconnect 36 may comprise a connection to another inductor, or a connection to a load powered by the Electricity Output 200, illustrated in FIG. 1 and FIG. 11.

Each of the inductor assemblies has connector terminals comprised of at least two terminals. The interconnecting conductors between them establish an interconnecting means. Every interconnection results in a fewer number of conductors emanating from the plurality of interconnected inductors so connected. In the exemplary embodiment, millions of inductors are connected in series, resulting in an accumulation of the electrical power from millions of inductors into a single pair of conductors, thereby providing a fewer number of conductors, by using microelectronic fabrication of an interconnecting means of a plurality of interconnected inductors. A million inductors have at least two million connection terminals. When interconnected, the million inductors have a result that may be comprised of two terminals instead of two million.

Again referring to FIG. 8, during the formation and dissipation of the vortices, the magnetic flux 38 may be comprised of an induced electric power in the inductor by the action of the vortex while the vortex is stationary with respect to the inductor and vortex material 41. This is by the increased density of magnetic flux within the vortex as compared to the density of the flux surrounding the vortex.

The electric power induced in the inductor may be induced by an electromagnetic induction comprised of a changing magnetic field with respect to the inductor by a movement of a vortex respectively to the inductor, where the vortex 39 that carries an increased magnetic field density within it moves with respect to the inductor 37. Although a means is deployed to have the vortices form at predetermined positions, vortices may move respectively to the vortex material and inductors by the action of energy in the vortex material. This energy may be comprised of the energy of the electrical current produced by the Quench Control 600 in FIG. 11.

The electric power induced in the inductor may be induced by an electromagnetic induction comprised of a changing magnetic field with respect to the inductor by a displacement of magnetic flux density from one vortex to another. This occurs by the property of the vortices, where an amount of flux in one vortex may displace to other vortices. Although the total of the flux density in all vortices is conserved, the flux passing through an inductor disposed nearby will change, producing electricity in the inductors that encompass the changing flux.

Figure 9A:
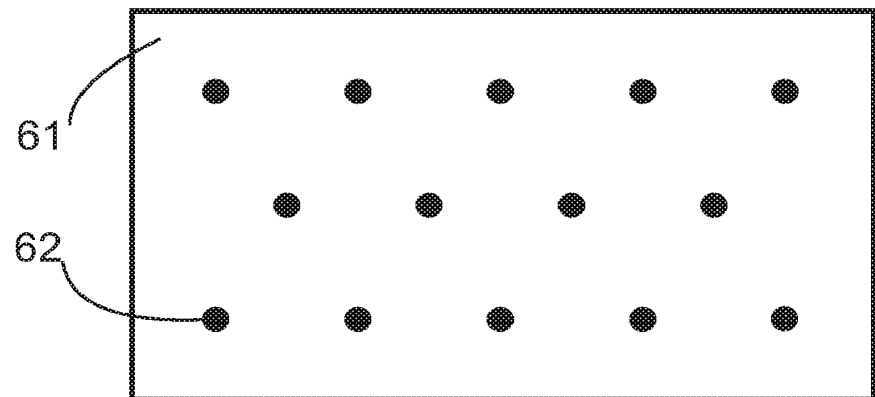
FIG. 9A is an enlarged expanded illustrated view of a surface plane of the vortex material, depicting the location where a means has been deployed to urge the formation of vortices at particular positions.

FIG. 9A illustrates a surface plane of the vortex material. In an exemplary implementation, the vortex material 61 is comprised layers of materials deposited on a substrate, that may either begin with the same substrate as the substrate for the inductor array, or utilize its own substrate. If on its own substrate, the substrate used may be comprised of a material that has a cryogenic contraction rate analogous to the rate of contraction of the inductor substrate, such that the alignment between the vortices and inductors is maintained across the range of operating temperatures. When a separate substrate is used, the substrate for the vortex material chip and the substrate for the inductor array chip may both be comprised of a one millimeter silicon wafer. When fabricating the layers of the vortex material chip, buffer and insulator layers are used, and a Bismuth based Type II superconductor thin film fifty nanometers thin deep, commonly known as Bi-2223 may be deposited, resulting in a smooth surface that will mate with the inductor chip's smoothed surface. While various exemplary implementations of the invention described herein refer to use of a Bismuth based Type II superconductor or Bi-2223, other types of superconductors, including other types of superconductor films, may be used as would be appreciated.

FIG. 9A also depicts the locations where a means to urge vortices to form at predetermined positions is deployed. Fourteen such locations are identified 62 although other numbers of such locations may be used. At locations 62, the material may have a change in static magnetic permeability, such as by the deposition of a material at these locations with a different magnetic permeability than the surrounding material, providing a means to urge a gradient in the magnetic field density resulting in a different magnetic field density, and in particular a static gradient change in the magnetic field at 62, whereby a vortex forms there.

Another means to urge vortices to form at predetermined positions may be comprised of the actuation of an inductor adjacent to the vortex material, by an electrical current in the inductor, using the inductor as a solenoid electromagnet, thus comprising a means for a dynamic gradient change in the magnetic field, whereby the vortex will form at the location 62, as urged by of the solenoid's magnetic field.

Another means to urge vortices to form at predetermined positions may be comprised of a means for a change in the uniformity of the vortex material at predetermined positions. This may be comprised of a change in molecular composition in the material, such as by the deposition of molecules that are different from the molecules of vortex material, at the predetermined positions 62.

Another means to urge vortices to form at predetermined positions may be comprised of a change in the crystal lattice structure, comprised of a defect or non-uniformity of the lattice at predetermined positions, comprised of a similar molecular formula as the whole, though with different atoms specifically at the predetermined positions 62 in the lattice.

Another means to urge vortices to form at predetermined positions may be comprised of a change in dimension of the vortex material at predetermined positions, such as a change in the thickness of the layers of substrate, buffer or vortex generating molecular regime, such as is used in the exemplary embodiment described below.

In the exemplary implementation, an etching process is used to change the dimension of the Bi-2223 thin film at locations 62, to establish the locations where vortices will form. This change in dimension is effected by an etching process that is comprised of reducing the depth of the Bi-2223 material by, for example, twenty five nanometers in a half spherical etching cavity that is, for example, twenty five nanometers in diameter, at each location 62.

Figure 9B:
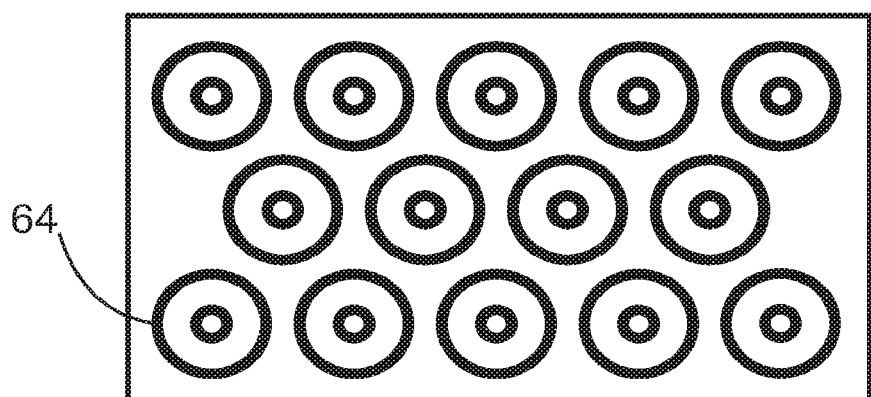
FIG. 9B is an enlarged expanded illustrated view of a surface plane of the vortex material of FIG. 9A, depicting vortices that have formed at the urged positions.

FIG. 9B illustrates the same vortex material as FIG. 9A, where the vortices 64 have formed.

FIG. 10 illustrates the corresponding locations of the inductor assemblies that are comprised of a layered construction method detailed in FIG. 3 and FIG. 3A, that are grouped into a matrix, and interconnected to accumulate the electric power induced into them by the modulated flux from the vortices of FIG. 9B.

In the exemplary implementation, the inductor array substrate 65 of FIG. 10 is assembled adjacent to the vortex material substrate 61 of FIG. 9A, by layering the two substrates upon each other. The result is that the vortices which form at the predetermined positions within the vortex material, that is layered to the inductor array substrate, are formed at positions with correspond to the position of the inductors.

In the exemplary implementation, the predetermined positions place the vortices, for example, three hundred and thirty nanometers apart at their centers. In order to encompass a net changing flux density in the inductors, the length of the segments in the inductors may be comprised of a length that is approximately half or less than the distance between the vortices. This establishes at least one predetermined dimension that in the exemplary embodiment is one hundred and sixty five nanometers in length, for example, for the segments of the inductors.

The predetermined positions and dimension are illustrated by the correspondence of the location of vortices and inductors in FIG. 6, FIG. 7, FIG. 8, FIG. 9A, FIG. 9B, and FIG. 10. For illustrative purposes, the figures shown may comprise a scale that is different from the scale of the exemplary implementation.

Referring to FIG. 2A, in the exemplary implementation, the inductor array is comprised of one billion interconnected inductor assemblies on a chip 28, with an area of one centimeter square. In FIG. 2A, the substrate of the inductor array chip 28 is facing up. The vortex material chip 29, on its own substrate, has its substrate facing down.

These two chips 28 and 29 of FIG. 2A are mounted to each other with the substrates facing outward, and the inductors and superconductor films separated by insulation layers comprised of, for example, one hundred nanometers total thickness from all mating surfaces.

In FIG. 2B, the two sandwiched chips from FIG. 2A are installed into the substrate, such that the chip 29 of FIG. 2A, now attached to chip 28, is concealed beneath chip 28 in the illustration of FIG. 2B, inside the substrate cavity 30 of FIG. 2A.

Figure 5:
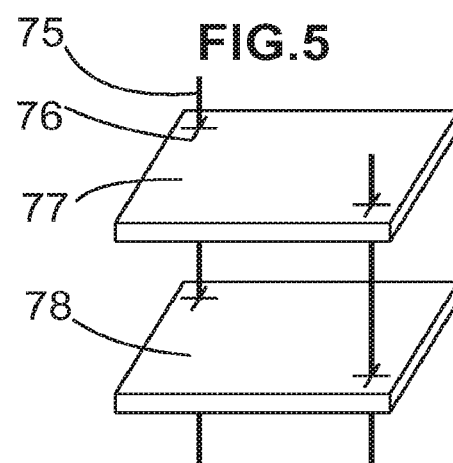
FIG. 5 is an enlarged expanded perspective schematic illustration representative of an alignment means used to align layered components in the vortex flux generator.

Referring to FIG. 5, the two layers 77 and 78 correspond to the two chips 28 and 29 of FIG. 2A, in this particular implementation. FIG. 5 depicts the usage of an alignment means to ensure the corresponding placement of the vortex locations and inductor locations using perpendicular references 75, and alignment marks 76 manufactured into each chip 77 and 78, wherein the alignment marks correspond to the placement of the elements of each respective chip to be aligned.

The two layers, 77 and 78, used in this generalized alignment means of the FIG. 5 illustration, may also refer to the alignment of individual layers, rather than specific chips.

The chips aligned and attached to each other using the aforesaid alignment method, are mounted into a substrate with a cavity 30 of FIG. 2A. The cavity provides a recess into which the chip 29 will be contained after being mounted to chip 28. The result is that the larger chip 28 appears on the top of the substrate 30, and this result is shown in FIG. 2B. This resulting aligned chip sandwich includes the vortex material 24, and inductor array 22, both of FIG. 1, inserted into the magnetic circuit 27.

The bismuth-based superconductor used as the source of the vortices in the vortex material chip operates at cryogenic temperatures, as a superconductor, in the magnetic field of the magnetic circuit. It can be quenched out of the superconducting state by an application of additional energy (e.g., nuclear energy, electromagnetic energy, thermal energy, modulation of the magnetic field, an electric current, etc.). When quenched, the vortices dissipate. These forms of energy may also comprise energy that provides the energy converted into electricity by the various implementations of the invention. The energy that is the source of the converted energy, and the energy that performs the quenching, may be comprised of at least one of these, or a plurality of these as would be appreciated.

A Bi-2223 superconductor thin film may be rapidly quenched with a modest electrical current when a static magnetic field is already present, as in the case of various implementations of the invention.

Figure 11:
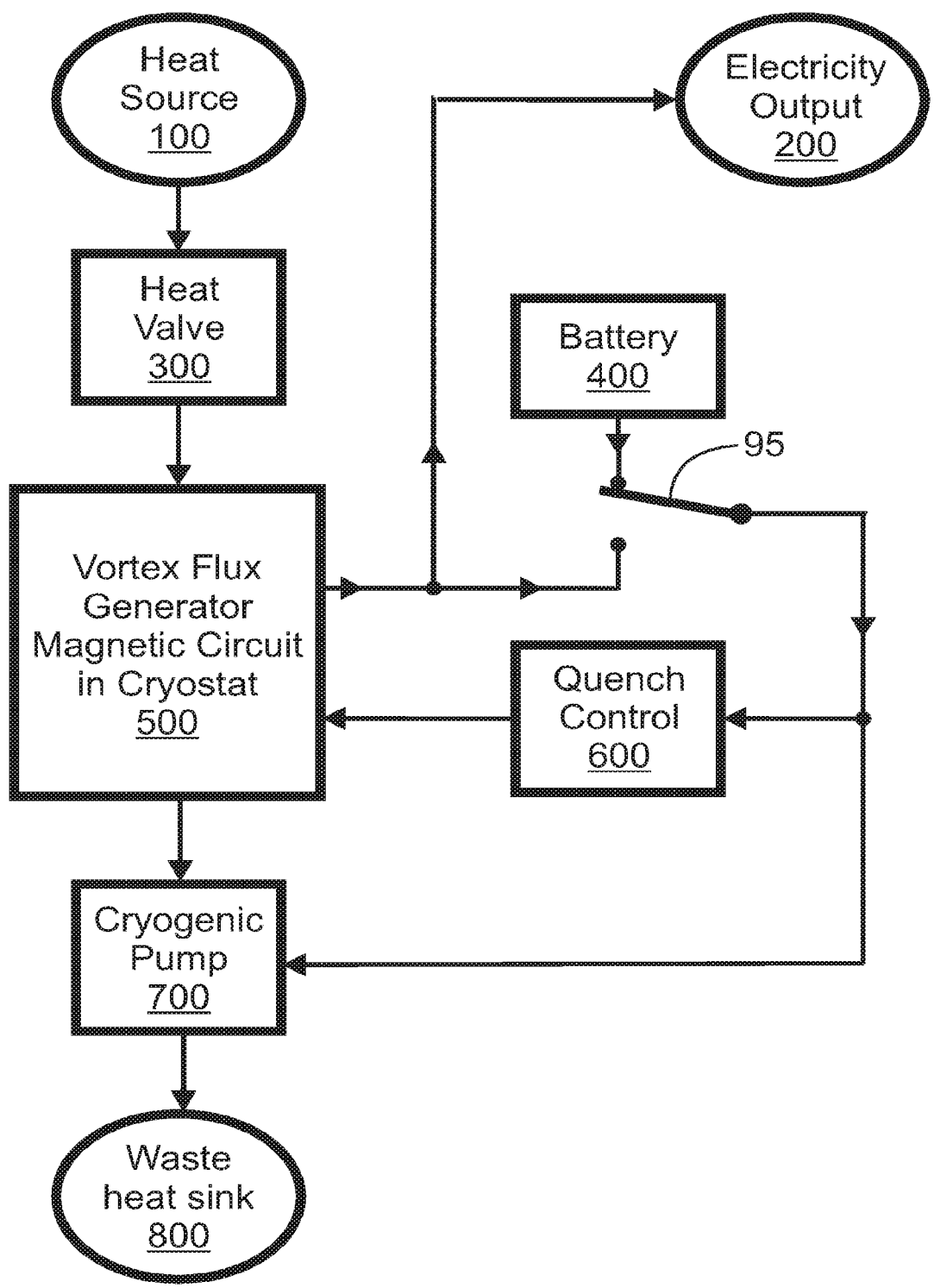
FIG. 11 is schematic illustration of the vortex flux generator depicting the elements of the control system, energy source, sink and output.

Referring to FIG. 11, in an exemplary implementation, a quench control circuit 600 applies a pulse of electric current to the vortex material. For example, in some implementations of the invention, the current used is ten times the nominal half ampere quenching current, applied as a high speed current pulse via Quench Control circuit 600, as a one hundred nanosecond, five ampere quenching pulse. This quenches the vortex material within 500, dissipating vortices. Feedback may be utilized by Quench Control 600 to modulate the quenching pulse, while utilizing minimal electric energy, such that the net Electricity Output 200 is maximized.

Although a vortex material used by various implementations of the invention may be comprised of one that is a re-entrant vortex material, a non-re-entrant vortex material, and a vortex material which is controlled by a means of stimulation nearby the vortex material, in the case of the exemplary embodiment, the controller of FIG. 1, exploded into detail within FIG. 11, supplies a means of external stimulation, via the pulsed current, to operate the vortex material in a cyclical re-entrant mode.

When the vortex material quenches, heat energy is transferred to the energy of the increased disorganization of the vortex material. That is, the vortices were more organized, and when the vortices dissipated, the vortex material becomes less organized. Heat energy is used in the vortex material to effect the change in organization. Because the vortex material is not operated adiabatically, instead of its temperature simply lowering, heat energy is transferred into the vortex material, whereby the vortex material effectively absorbs heat energy from its operating environment, especially through the heat valve 300. The actual action is that the heat energy transfers from the warmer heat valve 300 to the vortex material.

Energy supplied to the various implementations of the invention may be comprised of heat energy by heat source 100, as modulated by heat valve 300. Various implementations of the invention require a sufficient flow of energy to provide for the energy needed to be converted to electricity output 200, plus the energy that is output at waste heat sink output 800, plus the energy needed by self conversion to power the quench control 600 and cryogenic pump 700 when switch 95 is not in the battery 400 position.

After cessation of the quenching current pulse, and absorbing energy from the source, the Bi-2223 material, still below its superconducting temperature threshold Tc, will be in the superconducting state, and vortices are again formed, flux is modulated, and electricity generated in the inductor array chip within 500. Vortex formation, quenching, vortex dissipation, energy absorption, together with generation of electricity by electromagnetic induction from magnetic field modulation, are the cycles of the method of various implementations of the invention.

In the process to dissipate vortices by a pulsed electric current in the exemplary implementation, and transfer heat energy into the vortex material, more than one form of energy was involved in the cycles of the method of various implementations of the invention, comprised of the energy of an electric current and heat energy.

With the aforementioned chip construction and magnetic field strength, and operating at a cycle rate of, for example, one MHz, the usable Electricity Output for the system is ten watts, with an energy input that may be comprised of 10.1 watts. In some implementations of the invention, the system may be scaled upward, and the cycle rate may be increased to provide correspondingly higher output capacities as would be appreciated.

The vortex flux generator in an exemplary implementation may be used as a thermoelectric converter, with an intermediate phase of magnetic field modulation. Energy from the Heat Source 100 is converted into Electricity Output 200. Heat energy, which may be comprised of waste heat, is removed via the cryogenic pump 700 to the waste heat sink 800. Waste heat sink 800 may be comprised of a sink at a lower temperature than heat source 100.

Battery 400 is enabled via switch 95 to start the process, supplying electric power to run the cryogenic pump 700, and the quench control 600. After the cyclical energy generation operation begins, and the heat energy source is used as the energy input for the system, switch 95 may select that a portion of the electrical output of the generator 500 be used to power the quench control 600 and cryogenic pump 700, rather than use the battery.

Figure 12:
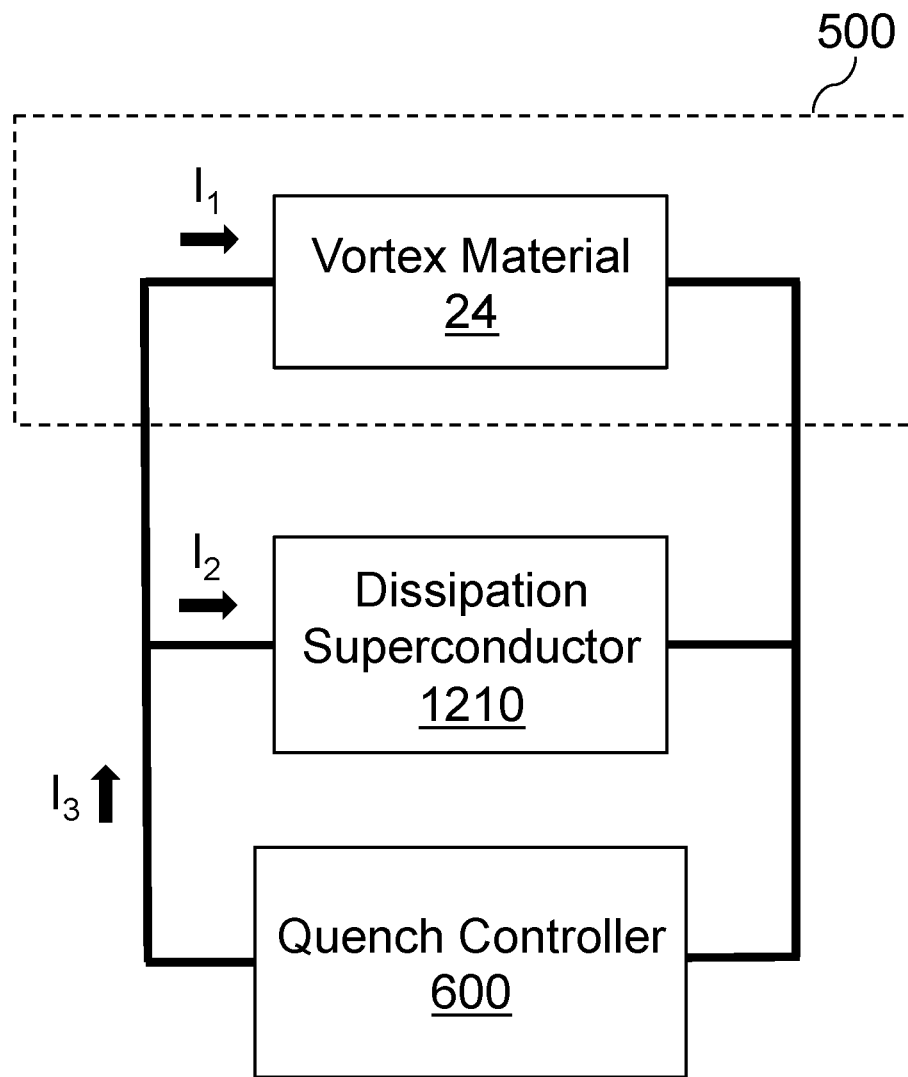
FIG. 12 illustrates an improved vortex flux generator in accordance with various implementations of the invention.

FIG. 12 illustrates an improved vortex flux generator 1200 according to various implementations of the invention. Improved vortex flux generator 1200 includes a vortex flux generator 500 and a quench controller 600 (and other components) as generally described above. Improved vortex flux generator 1200 also includes a dissipation superconductor (or superconducting material as would be appreciated) 1210 disposed in parallel with vortex material 24 of vortex flux generator 500.

According to various implementations of the invention, quench controller 600 provides a variable current, $I_3$, a portion of which is provided to vortex material 24 and a portion of which is provided to dissipation superconductor 1210. More particularly, quench controller 600 provides a first portion of variable current, $I_1$, to vortex material 24 and a second portion of variable current, $I_2$, to dissipation superconductor 1210, where $I_1+I_2=I_3$. As would be appreciated, vortex material 24 and dissipation superconductor 1210 have different critical currents as a result of differences in physical or chemical properties between vortex material 24 and dissipation superconductor 1210. As such, dissipation superconductor 1210 may be configured to quench (e.g., enter a non-superconducting state) at a critical current greater than that of vortex material 24.

Further, as would also be appreciated, dissipation superconductor 1210 may be configured to quench at a critical current greater than a maximum of variable current $I_3$ provided by quench controller 600. As a result, when vortex material 24 quenches by design, in response to an increasing first portion of variable current $I_1$ (and as a result of an increasing variable current $I_3$), dissipation superconductor 1210 may divert or carry the full amount of variable current $I_3$ while vortex material 24 remains in a non-superconducting state. In other words, when $I_1$ exceeds the critical current of vortex material 24, vortex material 24 transitions from a superconducting state having zero or near-zero resistance to a non-superconducting state having a non-zero resistance. When this occurs, first portion of variable current $I_1$ rapidly reduces to zero (or near zero) and virtually all of variable current $I_3$ will flow through dissipation superconductor 1210 in accordance with Ohm's Law; more particularly, $I_2 \approx I_3$ and $I_1 \approx 0$.

By diverting the full amount of variable current $I_3$, dissipation superconductor 1210 minimizes an amount of joule heating of vortex material 24 caused by current flowing through a non-zero resistance (as would be the case with vortex material 24 in its non-superconducting state). This reduces an amount of heat that needs to be extracted from the cryostat housing vortex material 24, thereby improving an overall efficiency of operation of improved vortex flux generator 1210.

According to various implementations of the invention, all interconnects in FIG. 12 coupling vortex material 24, dissipation superconductor 1210 and quench controller 600 may be implemented using superconductors having critical currents that exceed the full amount of variable current $I_3$ (i.e., to carry $I_3$ without quenching).

In some implementations of the invention, a cyclical waveform of variable current $I_3$ may be reduced below a hysteresis threshold of vortex material 24 in order to restore vortex material 24 to its superconducting state as would be appreciated. In some implementations of the invention, waveform of variable current $I_3$ may, periodically or otherwise, cycle between a maximum variable current $I_3$ sufficient to cause $I_2$ to exceed the critical current of vortex material 24 (and hence quench vortex material 24) and a minimum variable current $I_3$ sufficient to cause $I_2$ to fall below the hysteresis threshold of vortex material 24 (and hence cause vortex material 24 to return to its superconductive state).

Thus, the foregoing description of various implementations of the invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in various implementations of the invention described can be performed in alternate orders, certain steps can be omitted, and additional steps can be added. The implementations described above were chosen and described in order to best explain the principles of the invention and its practical application, thereby enabling others skilled in the art to understand the invention. It is intended that the scope of the invention be defined by the claims and their equivalents.

What is claimed is:

1. A vortex flux generator comprising:
   a magnetic circuit configured to produce a magnetic field;
   a quench controller configured to provide a variable current;
   a vortex material configured to form and subsequently dissipate a vortex in response to the variable current, where the formation and dissipation of the vortex cause a modulation of the magnetic field;
   an inductor disposed in a vicinity of the vortex such that the modulation of the magnetic field induces an electrical current in the inductor; and
   a dissipation superconductor electrically disposed in parallel with the vortex material and configured to carry, without quenching, an entirety of the variable current during dissipation of the vortex in the vortex material.

2. The vortex flux generator of claim 1, wherein the dissipation superconductor is further configured to carry a portion, less than the entirety, of the variable current during formation of the vortex.

3. The vortex flux generator of claim 1, wherein the vortex material comprises a second superconducting material having properties different from the dissipation superconductor.

4. The vortex flux generator of claim 1, wherein the vortex material has a first critical current, wherein the dissipation superconductor has a second critical current, wherein the second critical current is greater than the first critical current.

5. A method for forming and dissipating vortices in a vortex material, the method comprising:
   increasing a variable current, wherein a first portion of the variable current flows through the vortex material, wherein a second portion of the variable current flows through a dissipation superconductor electrically disposed in parallel with the vortex material, and wherein the first portion of the variable current causes vortices to form in the vortex material until the first portion of the variable current flowing through the vortex material exceeds a critical current of the vortex material thereby causing the vortex material to enter its non-superconducting state which in turn causes the vortices formed in the vortex material to dissipate, wherein an entirety of the variable current flows through the dissipation superconductor while the vortex material is in its non-superconducting state; and
   reducing the variable current until the vortex material returns to its superconducting state.

6. The method of claim 5, wherein the increasing the variable current and the reducing the variable current are repeated.

* * * * *